(12) United States Patent
Chang et al.

(10) Patent No.: US 12,374,750 B2
(45) Date of Patent: Jul. 29, 2025

(54) TRACTION BATTERY PACK ASSEMBLING METHOD

(71) Applicant: Ford Global Technologies, LLC, Dearborn, MI (US)

(72) Inventors: Che-Chun Chang, Ann Arbor, MI (US); Patrick Daniel Maguire, Ann Arbor, MI (US); Marc Dugas, Wixom, MI (US); Nilesh Patil, Kolhapur (IN)

(73) Assignee: Ford Global Technologies, LLC, Dearborn, MI (US)

( * ) Notice: Subject to any disclaimer, the term of this patent is extended or adjusted under 35 U.S.C. 154(b) by 497 days.

(21) Appl. No.: 17/844,311

(22) Filed: Jun. 20, 2022

(65) Prior Publication Data
US 2023/0307777 A1    Sep. 28, 2023

Related U.S. Application Data

(60) Provisional application No. 63/322,766, filed on Mar. 23, 2022.

(51) Int. Cl.
*H01M 50/293* (2021.01)
*H01M 50/209* (2021.01)
*H01M 50/249* (2021.01)

(52) U.S. Cl.
CPC ....... *H01M 50/293* (2021.01); *H01M 50/209* (2021.01); *H01M 50/249* (2021.01); *H01M 2220/20* (2013.01); *Y10T 29/49108* (2015.01)

(58) Field of Classification Search
CPC .. H01M 50/293; H01M 10/42; H01M 50/264; H01M 10/04; H01M 10/058; Y10T 29/49108

USPC .................................... 29/623.1, 426.1, 593
See application file for complete search history.

(56) References Cited

U.S. PATENT DOCUMENTS

| | | |
|---|---|---|
| 8,089,248 B2 | 1/2012 | Tabatowski-Bush |
| 8,968,912 B2 | 3/2015 | Maguire et al. |
| 9,187,004 B1 | 11/2015 | Davis |
| 9,217,781 B2 | 12/2015 | Tabatowski-Bush et al. |
| 9,425,628 B2 | 8/2016 | Pham et al. |
| 9,446,680 B2 | 9/2016 | Chen et al. |
| 9,515,357 B2 | 12/2016 | Haskins et al. |

(Continued)

FOREIGN PATENT DOCUMENTS

| | | |
|---|---|---|
| CN | 101860053 A | 10/2010 |
| CN | 101860053 B | 4/2015 |

(Continued)

*Primary Examiner* — Thiem D Phan
(74) *Attorney, Agent, or Firm* — David B. Kelley; Carlson, Gaskey & Olds, P.C.

(57) ABSTRACT

A battery pack assembly method includes compressing at least one cell stack, inserting the at least one cell stack into a cell-receiving opening of an enclosure structure, and pushing at least one cell of the at least one cell stack out of the enclosure structure using a pusher. Another traction battery pack assembly method includes moving a cell stack into an enclosure structure from a compression fixture that compresses the cell stack. The cell stack includes a plurality of battery cells. After the moving, the method compresses the cell stack using the enclosure structure. The method then includes establishing electrical connections between the battery cells of the cell stack, and testing the electrical connections prior to securing a busbar to the cell stack.

17 Claims, 6 Drawing Sheets

(56) References Cited

U.S. PATENT DOCUMENTS

| | | |
|---|---|---|
| 9,799,932 B2 | 10/2017 | Haskins et al. |
| 10,109,897 B2 | 10/2018 | Haskins et al. |
| 10,566,647 B2 | 2/2020 | Andryukov et al. |
| 10,573,859 B2 * | 2/2020 | Roddy .................. B60L 53/80 |
| 10,601,006 B2 * | 3/2020 | Maguire ............. H01M 50/209 |
| 10,608,222 B2 | 3/2020 | Montgomery et al. |
| 10,759,281 B2 | 9/2020 | Miller et al. |
| 10,784,495 B2 | 9/2020 | Fernandez-Galindo et al. |
| 11,005,131 B2 | 5/2021 | Zhou et al. |
| 11,024,913 B2 | 6/2021 | Subramanian et al. |
| 11,050,125 B1 | 6/2021 | Zhu et al. |
| 11,114,726 B2 | 9/2021 | Gu et al. |
| 11,128,009 B2 | 9/2021 | Chen et al. |
| 11,139,537 B2 | 10/2021 | Wu et al. |
| 11,217,847 B2 | 1/2022 | Eftekhari et al. |
| 11,258,119 B2 | 2/2022 | Wang et al. |
| 11,264,669 B2 | 3/2022 | Jiang |
| 11,283,130 B2 | 3/2022 | Chen et al. |
| 11,289,750 B2 | 3/2022 | Zhou et al. |
| 11,302,972 B2 | 4/2022 | Chu et al. |
| 11,302,973 B2 | 4/2022 | Maguire et al. |
| 11,302,990 B2 | 4/2022 | Huang et al. |
| 11,329,347 B2 | 5/2022 | Huang et al. |
| 11,335,960 B2 | 5/2022 | Wang et al. |
| 11,362,392 B2 | 6/2022 | Wang et al. |
| 11,362,393 B2 | 6/2022 | Wang et al. |
| 11,387,519 B2 | 7/2022 | Huang et al. |
| 11,404,744 B1 | 8/2022 | Yang et al. |
| 11,417,932 B2 | 8/2022 | Tang et al. |
| 11,417,936 B2 | 8/2022 | Wang et al. |
| 2010/0259221 A1 | 10/2010 | Tabatowski-Bush |
| 2013/0164592 A1 | 6/2013 | Maguire et al. |
| 2017/0104251 A1 | 4/2017 | Wang |
| 2019/0305389 A1 | 10/2019 | Poirier et al. |
| 2020/0091494 A1 | 3/2020 | Fernandez-Galindo et al. |
| 2020/0203684 A1 | 6/2020 | Chen et al. |
| 2020/0203779 A1 | 6/2020 | Wang et al. |
| 2020/0212387 A1 | 7/2020 | Su et al. |
| 2020/0212397 A1 | 7/2020 | Wang et al. |
| 2020/0212418 A1 | 7/2020 | Chen et al. |
| 2020/0381697 A1 | 12/2020 | Fernandez-Galindo et al. |
| 2021/0066686 A1 | 3/2021 | Siewert et al. |
| 2021/0091348 A1 | 3/2021 | Lateef et al. |
| 2021/0091437 A1 | 3/2021 | Chen et al. |
| 2021/0104798 A1 | 4/2021 | Jiang et al. |
| 2021/0119279 A1 | 4/2021 | Wang et al. |
| 2021/0218117 A1 | 7/2021 | Zhu et al. |
| 2021/0229541 A1 | 7/2021 | Smith et al. |
| 2021/0305641 A1 | 9/2021 | Bai et al. |
| 2021/0305642 A1 | 9/2021 | Bai et al. |
| 2021/0320349 A1 | 10/2021 | Jiang et al. |
| 2021/0320372 A1 | 10/2021 | Jiang et al. |
| 2021/0402863 A1 | 12/2021 | Huang et al. |
| 2021/0408634 A1 | 12/2021 | Yin et al. |
| 2022/0052414 A1 | 2/2022 | Huang et al. |
| 2022/0052415 A1 | 2/2022 | Huang et al. |
| 2022/0059897 A1 | 2/2022 | Huang et al. |
| 2022/0059902 A1 | 2/2022 | Jiang et al. |
| 2022/0077521 A1 | 3/2022 | Jin et al. |
| 2022/0085450 A1 | 3/2022 | Chu et al. |
| 2022/0102800 A1 | 3/2022 | Wang et al. |
| 2022/0109211 A1 | 4/2022 | Wang et al. |
| 2022/0123394 A1 | 4/2022 | Zhang et al. |
| 2022/0123423 A1 | 4/2022 | Wang et al. |
| 2022/0149458 A1 | 5/2022 | Jiang et al. |
| 2022/0158296 A1 | 5/2022 | Chen et al. |
| 2022/0185088 A1 | 6/2022 | Zhang et al. |
| 2022/0190416 A1 | 6/2022 | Wu |
| 2022/0190423 A1 | 6/2022 | Wu et al. |
| 2022/0216555 A1 | 7/2022 | Huang et al. |
| 2022/0221084 A1 | 7/2022 | Huang et al. |
| 2022/0231370 A1 | 7/2022 | Yang et al. |
| 2022/0231371 A1 | 7/2022 | Jiang et al. |
| 2022/0255172 A1 | 8/2022 | Guo et al. |

FOREIGN PATENT DOCUMENTS

| | | |
|---|---|---|
| CN | 107757374 A | 3/2018 |
| CN | 208738329 U | 4/2019 |
| CN | 209016158 U | 6/2019 |
| CN | 209045657 U | 6/2019 |
| CN | 110048042 A | 7/2019 |
| CN | 209071465 U | 7/2019 |
| CN | 209104196 U | 7/2019 |
| CN | 209104221 U | 7/2019 |
| CN | 209104222 U | 7/2019 |
| CN | 209104228 U | 7/2019 |
| CN | 209104230 U | 7/2019 |
| CN | 209104232 U | 7/2019 |
| CN | 209104234 U | 7/2019 |
| CN | 209104235 U | 7/2019 |
| CN | 209104236 U | 7/2019 |
| CN | 209104237 U | 7/2019 |
| CN | 209104238 U | 7/2019 |
| CN | 209104242 U | 7/2019 |
| CN | 209104331 U | 7/2019 |
| CN | 209183581 U | 7/2019 |
| CN | 209183604 U | 7/2019 |
| CN | 209183605 U | 7/2019 |
| CN | 209183611 U | 7/2019 |
| CN | 209183612 U | 7/2019 |
| CN | 209183614 U | 7/2019 |
| CN | 209249637 U | 8/2019 |
| CN | 209357799 U | 9/2019 |
| CN | 209401679 U | 9/2019 |
| CN | 209401680 U | 9/2019 |
| CN | 209401682 U | 9/2019 |
| CN | 209401684 U | 9/2019 |
| CN | 209401715 U | 9/2019 |
| CN | 209447908 U | 9/2019 |
| CN | 110350256 A | 10/2019 |
| CN | 209592271 U | 11/2019 |
| CN | 209607884 U | 11/2019 |
| CN | 209641720 U | 11/2019 |
| CN | 209710493 U | 11/2019 |
| CN | 209730104 U | 12/2019 |
| CN | 209747621 U | 12/2019 |
| CN | 209787546 U | 12/2019 |
| CN | 209843820 U | 12/2019 |
| CN | 209936788 U | 1/2020 |
| CN | 110931700 A | 3/2020 |
| CN | 210136922 U | 3/2020 |
| CN | 210136943 U | 3/2020 |
| CN | 210182435 U | 3/2020 |
| CN | 210566905 U | 5/2020 |
| CN | 111354885 A | 6/2020 |
| CN | 210744037 U | 6/2020 |
| CN | 111384314 B | 1/2021 |
| CN | 111384325 B | 2/2021 |
| CN | 112310525 A | 2/2021 |
| CN | 112331982 A | 2/2021 |
| CN | 109742281 B | 5/2021 |
| CN | 111354987 B | 5/2021 |
| CN | 111384337 B | 5/2021 |
| CN | 112331981 B | 9/2021 |
| CN | 112331997 B | 11/2021 |
| CN | 113871789 A | 12/2021 |
| CN | 112310541 B | 3/2022 |
| CN | 216054919 U | 3/2022 |
| CN | 216120549 U | 3/2022 |
| CN | 216120659 U | 3/2022 |
| CN | 216213898 U | 4/2022 |
| CN | 216354437 U | 4/2022 |
| CN | 216354439 U | 4/2022 |
| CN | 111430826 B | 6/2022 |
| CN | 216720168 U | 6/2022 |
| CN | 216720172 U | 6/2022 |
| CN | 216750072 U | 6/2022 |
| CN | 216750142 U | 6/2022 |
| CN | 216872085 U | 7/2022 |
| CN | 216903107 U | 7/2022 |
| CN | 216903128 U | 7/2022 |
| CN | 216903497 U | 7/2022 |
| DE | 102016119118 A1 | 4/2017 |

(56) References Cited

FOREIGN PATENT DOCUMENTS

| | | |
|---|---|---|
| DE | 102017121796 A1 | 3/2018 |
| DE | 102019108631 A1 | 10/2019 |
| DE | 102019125140 A1 | 3/2020 |
| DE | 102020124986 A1 | 3/2021 |
| DE | 102021101385 A1 | 9/2021 |
| EP | 3671904 A1 | 6/2020 |
| EP | 3671940 A1 | 6/2020 |
| EP | 3672377 A1 | 6/2020 |
| EP | 3675204 A1 | 7/2020 |
| EP | 3675207 A1 | 7/2020 |
| EP | 3675216 B1 | 7/2020 |
| EP | 3675217 A1 | 7/2020 |
| EP | 3675220 A1 | 7/2020 |
| EP | 3675221 A1 | 7/2020 |
| EP | 3675236 A1 | 7/2020 |
| EP | 3675271 A1 | 7/2020 |
| EP | 3798491 A1 | 3/2021 |
| EP | 3799150 A1 | 3/2021 |
| EP | 3799151 A1 | 3/2021 |
| EP | 3905366 A1 | 3/2021 |
| EP | 3806231 A1 | 4/2021 |
| EP | 3852187 A1 | 7/2021 |
| EP | 3859867 A1 | 8/2021 |
| EP | 3920255 A1 | 8/2021 |
| EP | 3883005 A1 | 9/2021 |
| EP | 3883006 A1 | 9/2021 |
| EP | 3883042 A1 | 9/2021 |
| EP | 3886198 A1 | 9/2021 |
| EP | 3886200 A1 | 9/2021 |
| EP | 3886201 A1 | 9/2021 |
| EP | 3671893 B1 | 11/2021 |
| EP | 3699979 B1 | 11/2021 |
| EP | 3920315 A1 | 12/2021 |
| EP | 3930027 A1 | 12/2021 |
| EP | 3944397 A1 | 1/2022 |
| EP | 3944398 A1 | 1/2022 |
| EP | 3955333 A1 | 2/2022 |
| EP | 3799194 B1 | 3/2022 |
| EP | 3985787 A1 | 4/2022 |
| EP | 3799153 B1 | 6/2022 |
| IN | 209104229 U | 7/2019 |
| IN | 110416448 A | 11/2019 |
| JP | 2010246372 A | 10/2010 |
| KR | 1020100112530 A | 10/2010 |
| KR | 101695641 B1 | 1/2017 |

\* cited by examiner

TRACTION BATTERY PACK ASSEMBLING METHOD

CROSS-REFERENCE TO RELATED APPLICATIONS

This application claims priority to U.S. Provisional Application No. 63/322,766, which was filed on 23 Mar. 2022 and is incorporated herein by reference

TECHNICAL FIELD

This disclosure relates generally to a method of assembling a traction battery pack and, more particularly, to how battery cells are inserted into the battery pack.

BACKGROUND

Electrified vehicles differ from conventional motor vehicles because electrified vehicles include a drivetrain having one or more electric machines. The electric machines can drive the electrified vehicles instead of, or in addition to, an internal combustion engine. A traction battery pack assembly can power the electric machines. The traction battery pack assembly of an electrified vehicle can include groups of battery cells.

SUMMARY

In some aspects, the techniques described herein relate to a battery pack assembly method, including: compressing at least one cell stack; inserting the at least one cell stack into a cell-receiving opening of an enclosure structure; and pushing at least one cell of the at least one cell stack out of the enclosure structure using a pusher.

In some aspects, the techniques described herein relate to a method, wherein the compressing includes compressing a first cell stack and a second cell stack, wherein the inserting included inserting both the first cell stack and the second cell stack into the enclosure structure.

In some aspects, the techniques described herein relate to a method, further including inserting the first cell stack together with the second cell stack using a plunger that contacts both the first cell stack and the second cell stack during the inserting.

In some aspects, the techniques described herein relate to a method, wherein the first cell stack and the second cell stack are spaced from each other during the inserting.

In some aspects, the techniques described herein relate to a method, further including compressing the first cell stack using a first compression fixture, and compressing the second cell stack using second compression fixture that is different than the first compression fixture.

In some aspects, the techniques described herein relate to a method, wherein the first cell stack and the second cell stack are each disposed along a respective cell stack axis, and further including, prior to the inserting, pressing the first cell stack relatively toward the second cell stack.

In some aspects, the techniques described herein relate to a method, further including pressing until the first compression fixture contacts the second compression fixture.

In some aspects, the techniques described herein relate to a method, wherein the enclosure structure is an enclosure halo.

In some aspects, the techniques described herein relate to a method, wherein the compressing of the at least one cell stack is along an axis, wherein the inserting moves the at least one cell stack relative to the enclosure structure in a direction that is perpendicular to the axis.

In some aspects, the techniques described herein relate to a method, further including after the inserting, applying a compressive force to the at least one cell stack with the enclosure structure.

In some aspects, the techniques described herein relate to a method, wherein the enclosure structure circumferentially surrounds the at least one cell stack after the inserting.

In some aspects, the techniques described herein relate to a method, wherein the pushing is in response to an inspection of the at least one cell stack after the inserting.

In some aspects, the techniques described herein relate to a method, wherein the inspection includes an inspection of a weld.

In some aspects, the techniques described herein relate to a method, wherein the weld is a busbar weld.

In some aspects, the techniques described herein relate to a method, wherein the pusher occupies the place of the at least one cell that is pushed out of the enclosure structure until at least one replacement cell is inserted into the cell-receiving opening of the enclosure structure.

In some aspects, the techniques described herein relate to a traction battery pack assembly method, including: moving a cell stack into an enclosure structure from a compression fixture that compresses the cell stack, the cell stack including a plurality of battery cells; after the moving, compressing the cell stack using the enclosure structure; establishing electrical connections between the battery cells of the cell stack; and testing the electrical connections prior to securing a busbar to the cell stack.

In some aspects, the techniques described herein relate to a traction battery pack assembly method, further including, after the testing, removing at least one of the battery cells from the cell stack using a pusher.

In some aspects, the techniques described herein relate to a traction battery pack assembly method, wherein the pusher occupies a position of the individual battery cell after the removing.

In some aspects, the techniques described herein relate to a traction battery pack assembly method, further including installing the busbar after the testing, the busbar electrically connecting the cell stack to another cell stack compressed by the enclosure structure.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details example traction battery pack assemblies having an enclosure that provides an interior area. Battery cells and electronic modules can be held within the interior area along with other components. The battery cells can be used to power an electric machine.

In particular, this disclosure details an exemplary systems and methods relating to assembling traction battery pack assemblies.

Figure 1:
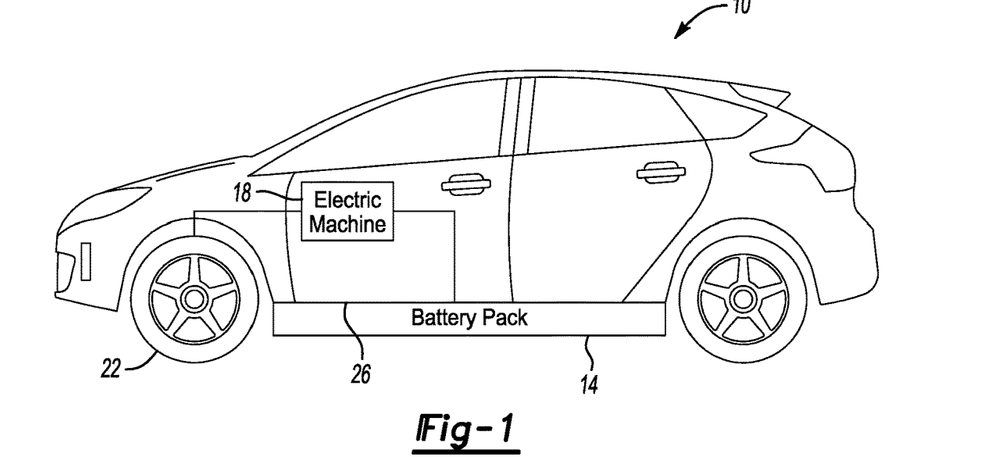
FIG. 1 illustrates a side view of an electrified vehicle.

With reference to FIG. 1, an electrified vehicle 10 includes a traction battery pack assembly 14, an electric machine 18, and wheels 22. The traction battery pack assembly 14 powers an electric machine 18, which can convert electrical power to mechanical power to drive the wheels 22. The traction battery pack assembly 14 can be a relatively high-voltage battery.

The traction battery pack assembly 14 is, in the exemplary embodiment, secured to an underbody 26 of the electrified vehicle 10. The traction battery pack assembly 14 could be located elsewhere on the electrified vehicle 10 in other examples.

The electrified vehicle 10 is an all-electric vehicle. In other examples, the electrified vehicle 10 is a hybrid electric vehicle, which selectively drives wheels using torque provided by an internal combustion engine instead of, or in addition to, an electric machine. Generally, the electrified vehicle 10 could be any type of vehicle having a traction battery pack.

Figure 2:
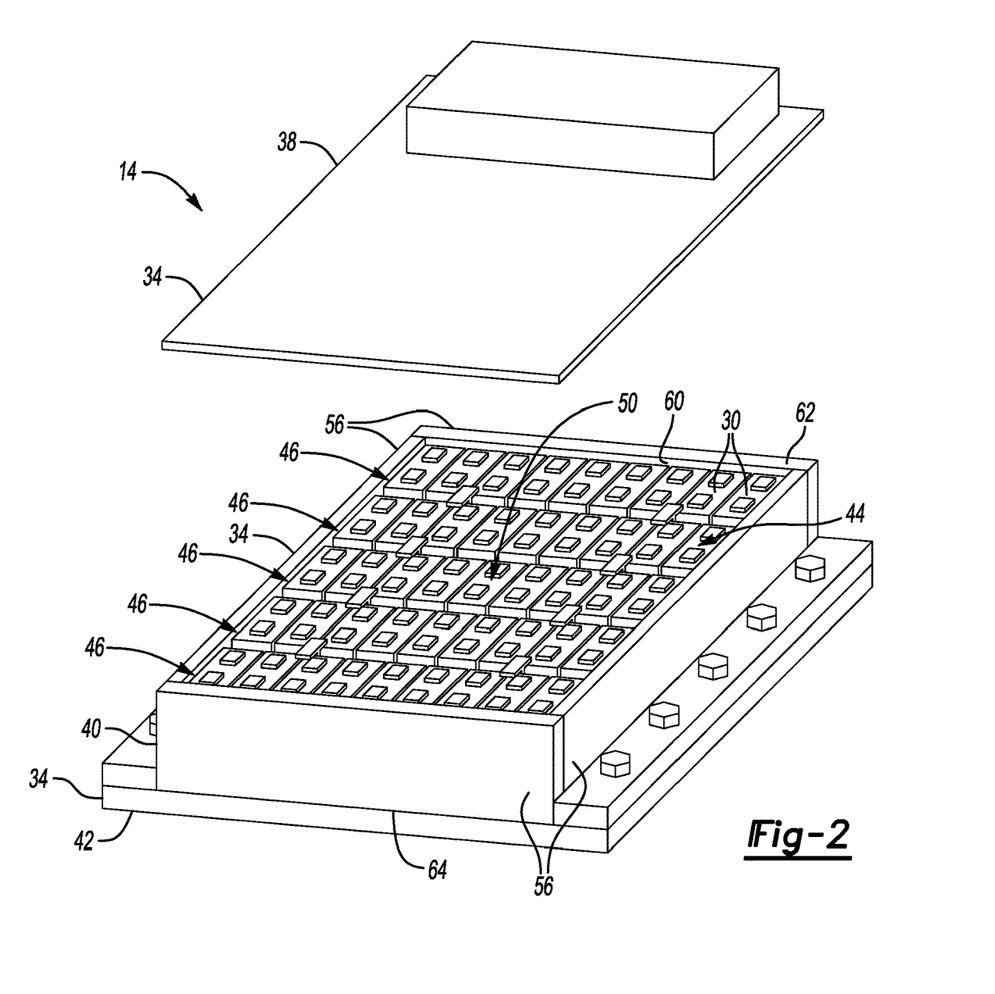
FIG. 2 illustrates a partially expanded view of a traction battery pack assembly from the electrified vehicle of FIG. 1 according to an exemplary aspect of the present disclosure.

With reference now to FIG. 2, the traction battery pack assembly 14 includes a plurality of battery cells 30 held within an enclosure assembly 34. In the exemplary embodiment, the enclosure assembly 34 comprises various enclosure structures. In particular, the example enclosure assembly 34 includes an enclosure cover 38, and enclosure halo 40, and an enclosure floor 42. The enclosure cover 38, enclosure halo 40, and enclosure floor 42 are secured together to provide an interior area 44 that houses the plurality of battery cells 30.

The plurality of battery cells (or simply, "cells") 30 are for supplying electrical power to various components of the electrified vehicle 10. The battery cells 30 are stacked side-by-side relative to one another to construct one of a plurality of cell stacks 46, which are positioned side-by-side to provide a cell matrix 50. In this example, each cell stack 46 includes nine individual battery cells 30, and the cell matrix 50 includes five cell stacks 46.

Although a specific number of battery cells 30 and cell stacks 46 are illustrated in the various embodiments of this disclosure, the traction battery pack assembly 14 could include any number of cells 30 and cell stacks 46. In some examples, the embodiments can include an even quantity of battery cells 30 and an even quantity of cell stacks 46, which can help to support and efficient electrical bussing arrangement. In other words, this disclosure is not limited to the specific configuration of cells 30 shown in FIG. 2.

In an embodiment, the battery cells 30 are prismatic, lithium-ion cells. However, battery cells having other geometries (cylindrical, pouch, etc.) and/or chemistries (nickel-metal hydride, lead-acid, etc.) could alternatively be utilized within the scope of this disclosure.

The enclosure halo 40, in this example, includes a plurality of side walls 56 arranged relative to one another to provide a cell-receiving opening 60. The side walls 56 can be extruded, roll formed, cast, molded or other structures connected together by welding, fastening, or bonding, for example.

When the traction battery pack assembly 14 is assembled, the enclosure cover 38 can be secured to vertically upper side 62 of the enclosure halo 40. An interface between the enclosure cover 38 and the enclosure halo 40 extends circumferentially continuously about the interior area 44. When the traction battery pack assembly 14 is assembled, the enclosure floor 42 can be secured to vertically lower side 64 of the enclosure halo 40. An interface between the enclosure floor 42 and the enclosure halo 40 extends circumferentially continuously about the interior area 44. Mechanical fasteners or welds, for example, can be used to secure the enclosure cover 38 and the enclosure floor 42 to the enclosure halo 40. Vertical, for purposes of this disclosure, is with reference to ground and a general orientation of the electrified vehicle 10 during operation.

When the traction battery pack assembly 14 is assembled, the cell matrix 50 is positioned within the cell-receiving opening 60. The example enclosure halo 40 includes one cell-receiving opening 60, but it should be understood that this disclosure also extends to enclosure assemblies providing more than one cell-receiving opening. The enclosure cover 38 can cover the cell matrix 50 within the cell-receiving opening 60 to substantially surround the cells 30 from all sides.

The enclosure halo 40 compresses and holds the cell matrix 50 when the cell matrix 50 is inserted into the cell-receiving opening 60 of the enclosure halo 40. In this example, the side walls 56 of the enclosure halo 40 apply forces to the cell matrix 50 when the cell matrix 50 is positioned within the cell-receiving opening 60.

The traction battery pack assembly 14 can be considered a cell-to-pack battery assembly. Unlike conventional traction battery pack battery assemblies, a cell-to-pack battery assembly incorporates battery cells or other energy storage devices into the enclosure assembly 34 without the cells being arranged in arrays or modules. The enclosure assembly 34 applies compressive forces to the cells. The cell-to-pack battery assembly may therefore eliminate most, if not all, of the array support structures used in conventional battery arrays (e.g., array frames, spacers, rails, walls, endplates, bindings, etc.) that are used to group and hold the battery cells within the arrays/modules.

The cell matrix 50 comprises a plurality of separate cell stacks 46, which are simultaneously inserted into the cell-receiving opening of the enclosure halo 40. To insert the example cell matrix 50 into the cell-receiving opening 60, the cells stacks 46 of the cell matrix 50 are compressed, and, while compressed, moved into place in the cell-receiving opening 60. The fixturing relied on the compress the cell stacks 46 is removed as the cell matrix 50 is inserted. The cell stacks 46 can expand somewhat within the enclosure assembly 34, but are still compressed by the enclosure assembly 34.

An exemplary method of assembling the traction battery pack 14 will now be explained in connection with FIGS. 3-8.

Figure 3:
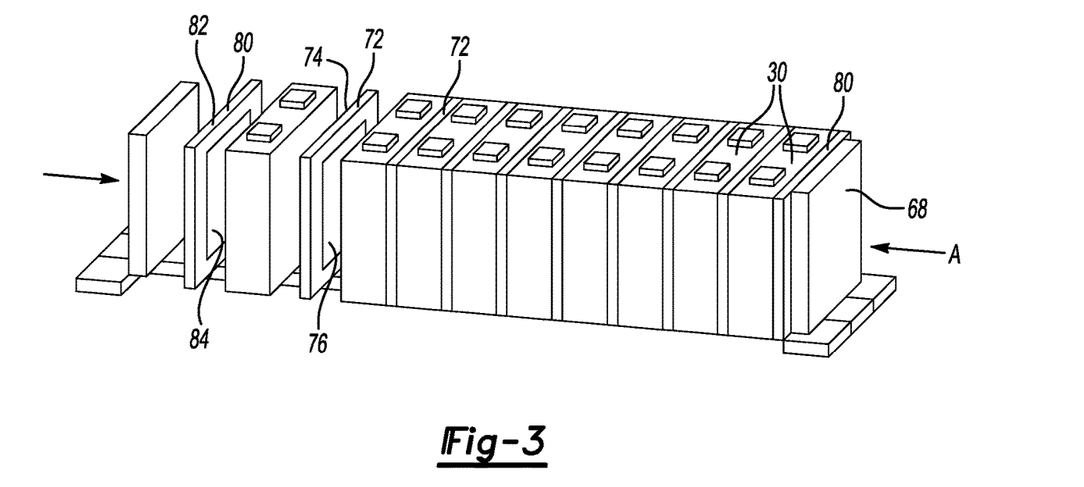
FIG. 3 illustrates a group of cells being compressed by a compression fixture to provide a cell stack for the traction battery pack assembly of FIG. 2.
Figure 4:
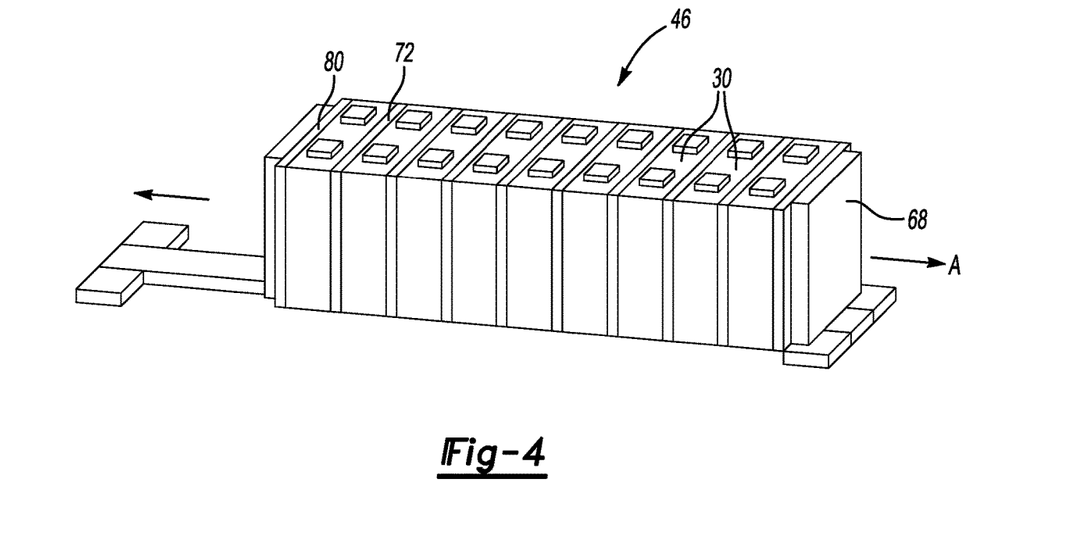
FIG. 4 illustrates the group of cells of FIG. 3 compressed by the compression fixture and providing the cell stack.

First, groups of cells 30 are compressed along a cell stack axis A as shown in FIG. 3 to provide one of the cell stacks 46. A compression fixture 68 is used to compress the cells 30 along the cell stack axis A. The compressive force exerted on the cells 30 by the compression fixture 68 is 3 kilonewtons in some examples. An external unit can apply forces to the compression fixture 68 until reaching a position that applies the desired compressive force to the cell stack 46 along the cell stack axis A. The compression fixture 68 can then be locked in this position, and the external unit removed. The external unit could be a ball screw that presses against a die spring to move the compression fixture 68.

In this example, within the cells stacks 46, separator plates 72 are disposed between each of the cells 30 along the cell stack axis A. The separator plates 72 can include a frame portion 74 that holds a compressible material 76. The compressible material 76 can compress to permit some expansion of the cells 30. The compressible material 76 can be foam.

Within each of the cell stacks 46, slider plates 80 are disposed at opposing axial ends of the cells 30. The slider plates 80 include a frame portion 82 that holds a compressible material 84. The compressible material 84 can be foam. The compressible material 84 can compress to permit some expansion of the cells 30.

In the example method, this step is repeated five times to provide the five cell stacks 46 of the traction battery pack assembly 14. Each of the cell stacks 46 is compressed and held by a different compression fixture that mimics the compression fixture 68. Thus, five compression fixtures are used to provide the five cell stacks 46 of the example traction battery pack assembly 14.

Figure 5:
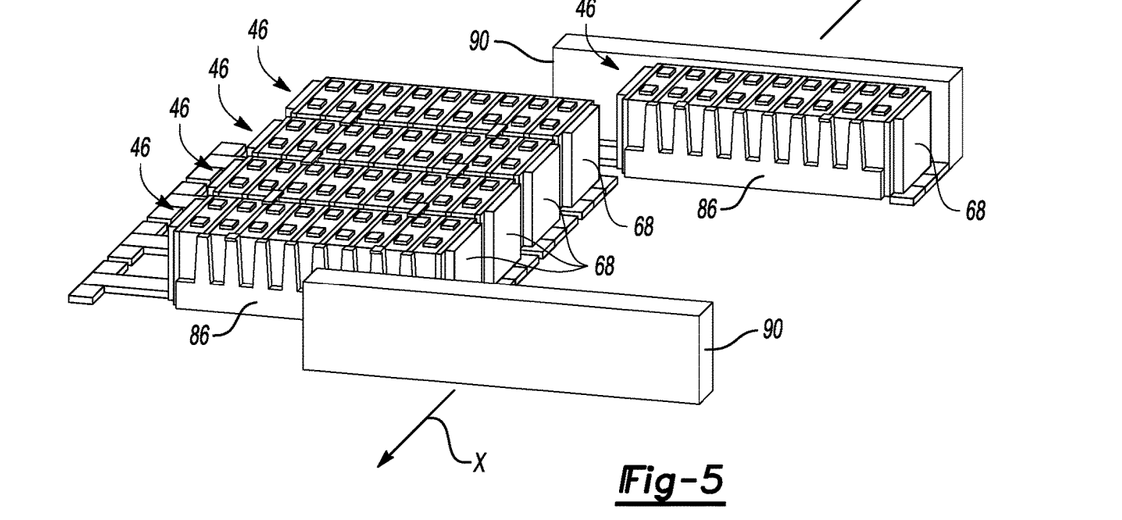
FIG. 5 illustrates the cell stack of FIG. 4 being aligned with other cell stacks to provide a cell matrix for the traction battery pack assembly of FIG. 2.

Next, as shown in FIG. 5, the cell matrix 50 is established by positioning the five cell stacks 46 side-by-side while compression fixtures 68 are holding the cell stacks 46. Spacers 86 are positioned between the each of the cell stacks 46. The spacers 86 can keep the cell stacks 46 from directly contacting one another and can provide a space to introduce an adhesive, if desired.

A cell matrix joiner assembly 90, in this examples, is moved by an actuator along a joiner axis X to press the five cell stacks 46 together along the axis X. When the traction battery pack assembly 14 is installed within the vehicle, the axis X corresponds to a longitudinal axis of the electrified vehicle 10.

In this example, the cell matrix joiner assembly 90 presses the cell stacks 46 along the axis X until the compression fixtures 68 contact each other, which prevents the cells 30 in one of the cell stacks 46 from directly contacting the cells 30 in another of the cell stacks 46. The spacers 86 can instead, or additionally, prevent such contact. Contact between the compression fixtures 68 can help to locate the cell stacks 46 relative to each other.

In other examples, the spacers 86 are omitted, and the cell stacks 46 are pressed together by the cell matrix joiner assembly 90 until the cells 30 of one of the cell stacks 46 directly contact the cells 30 in another of the cell stacks 46.

Each of the cell stacks 46 is compressed along the cell stack axis A by the respective compression fixture 68. Within the cell matrix 50, the cell stack axes A are parallel to each other. The inserting step moves the cell matrix 50 relative to the enclosure halo 40 in a direction that is perpendicular to the cell stack axes A.

Figure 6:
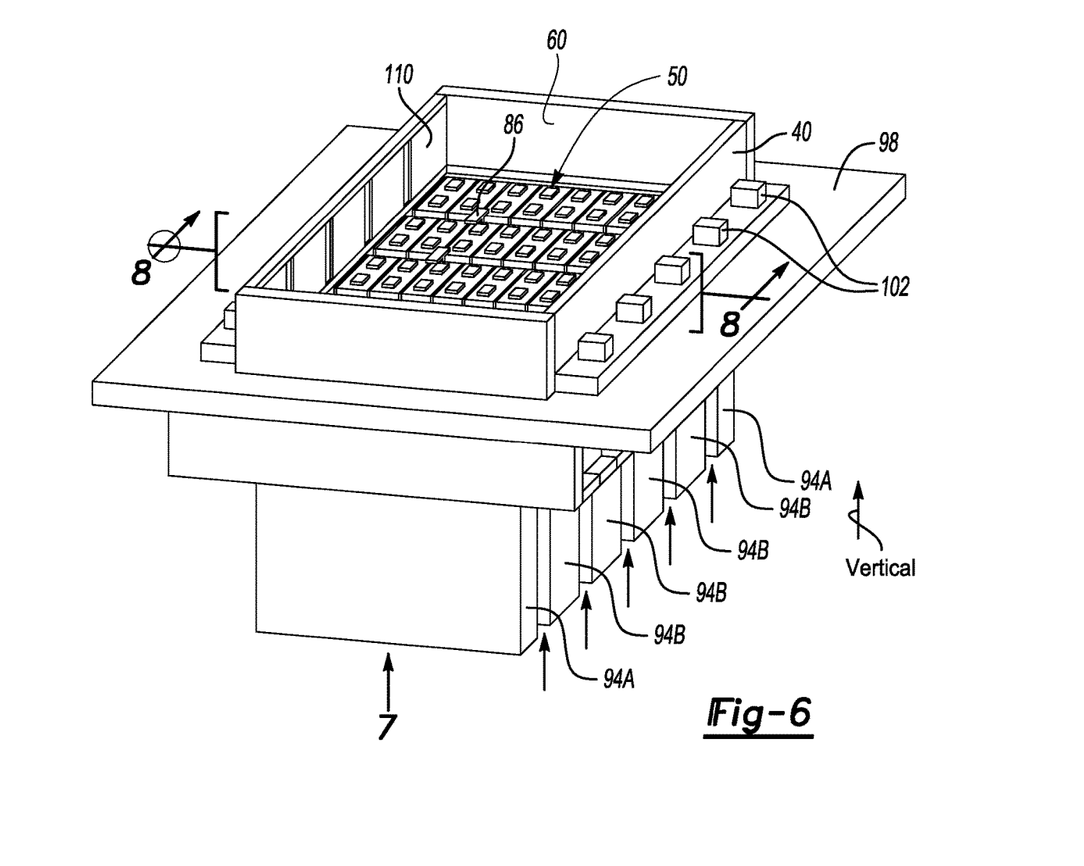
FIG. 6 illustrates the cell matrix of FIG. 5 being inserted into an enclosure halo.
Figure 7:
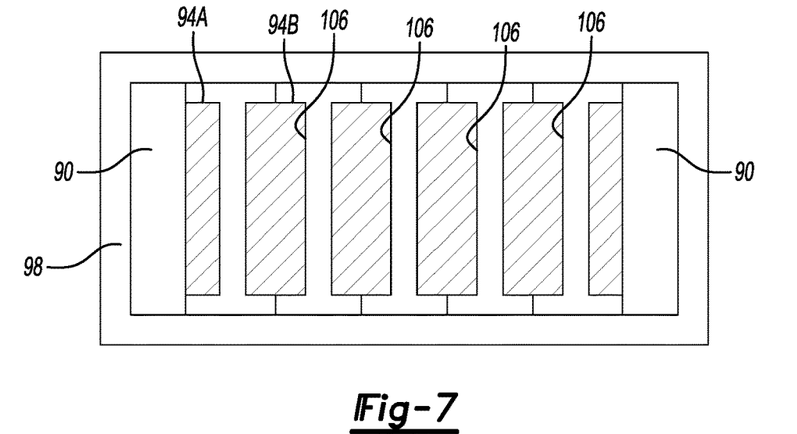
FIG. 7 illustrates a bottom view of FIG. 6.

Referring again to the example of FIG. 5, after the pressing, the cell matrix 50 is moved relative to the enclosure halo 40 until the cell matrix 50 is vertically beneath the enclosure halo 40 and the cell-receiving opening 60 as shown in FIGS. 6 and 7. The cell matrix joiner assembly 90 and the compression fixtures 68 hold together the cell matrix 50 until the cell matrix 50 is positioned vertically beneath the enclosure halo 40.

The assembly method then inserts the cell matrix 50, which again includes five cell stacks 46 in this example, into the cell-receiving opening 60 of the enclosure halo 40. In this example, the five cell stacks 46 are spaced a distance from each other during the inserting. During the inserting, the enclosure halo 40 is secured to a halo pallet 98. Locator pins 102 can be used to locate the enclosure halo 40 relative to the halo pallet 98 during the inserting.

To insert the cell matrix 50, a plurality of plungers 94 are driven upwards by actuators to press the cell stacks 46 vertically upward out of the compression fixtures 68 and into the cell-receiving opening 60. In other examples, the cell stacks 46 can be inserted into the cell receiving opening 60 in other directions.

The compression fixtures 68, when viewed from the bottom as shown in FIG. 7, have an "I" shaped profile. The compression fixtures 68 each establish a partial perimeter of an aperture 106 when in contact with each other.

In this example, the plurality of plungers 94 includes plungers 94A and plungers 94B. Each of the plungers 94B extends through one of the apertures 106 when inserting the cell matrix 50 into the cell-receiving opening 60. Each of the plungers 94B contacts two cell stacks 46 during the inserting. The plungers 94A contact a single cell stack during the inserting.

After the inserting, the enclosure halo 40 circumferentially surrounds the cell stack 46 of the cell matrix 50. The inserting positions the cell matrix 50 within the enclosure halo 40, which exerts a compressive force on the cell stacks 46. The enclosure halo 40 may permit some expansion of the cells 30 after being removed from the compression fixtures 68. A compressive force exerted on the cell stack 46 by the enclosure halo 40 after the inserting is thus less than a compressive force exerted on the cell stacks by the compression fixtures 68.

Figure 8:
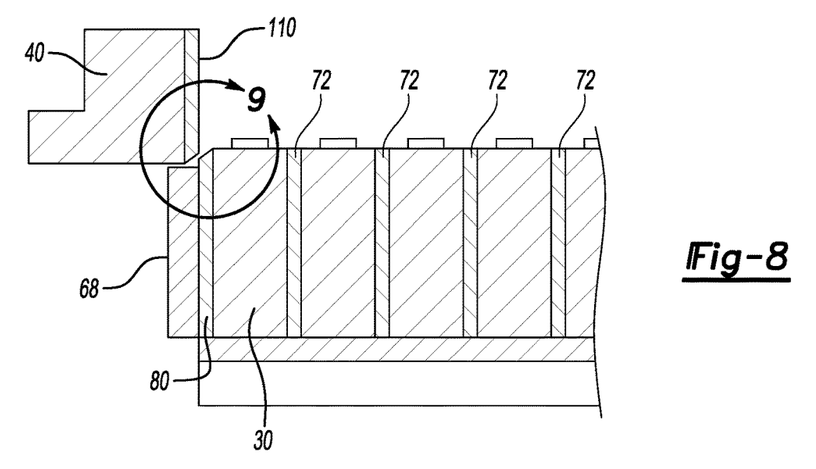
FIG. 8 illustrates section view generally taken at line 8-8 in FIG. 6.
Figure 9:
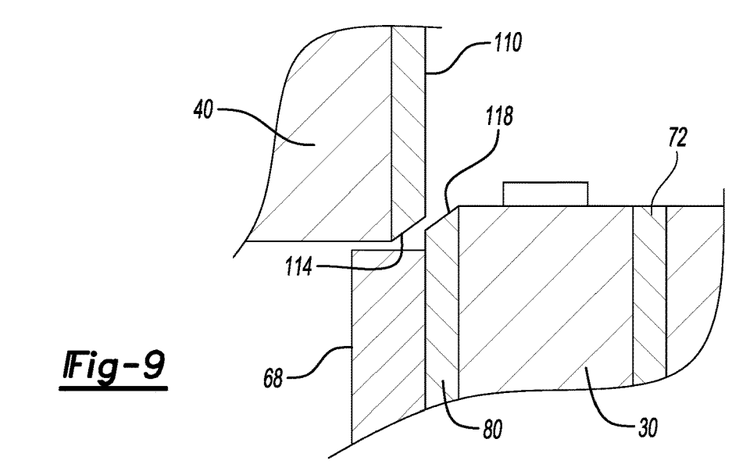
FIG. 9 illustrates a close-up view of an area of FIG. 8.

With reference to FIGS. 8 and 9 and continued reference to FIG. 7, to facilitate the inserting, the inner surfaces of the example enclosure halo 40 are lined with shim plates 110 having leading edges 114 that are chamfered. The slider plates 80 associated with the cell stacks 46 have a leading edge 118 that is chamfered. The slider plates 80 interface directly with the shim plates 110 during the inserting. Chamfers on the leading edges 114 and the leading edges 118 can help to guide the cell stacks 46 into the cell-receiving opening 60 during the inserting.

Figure 10:
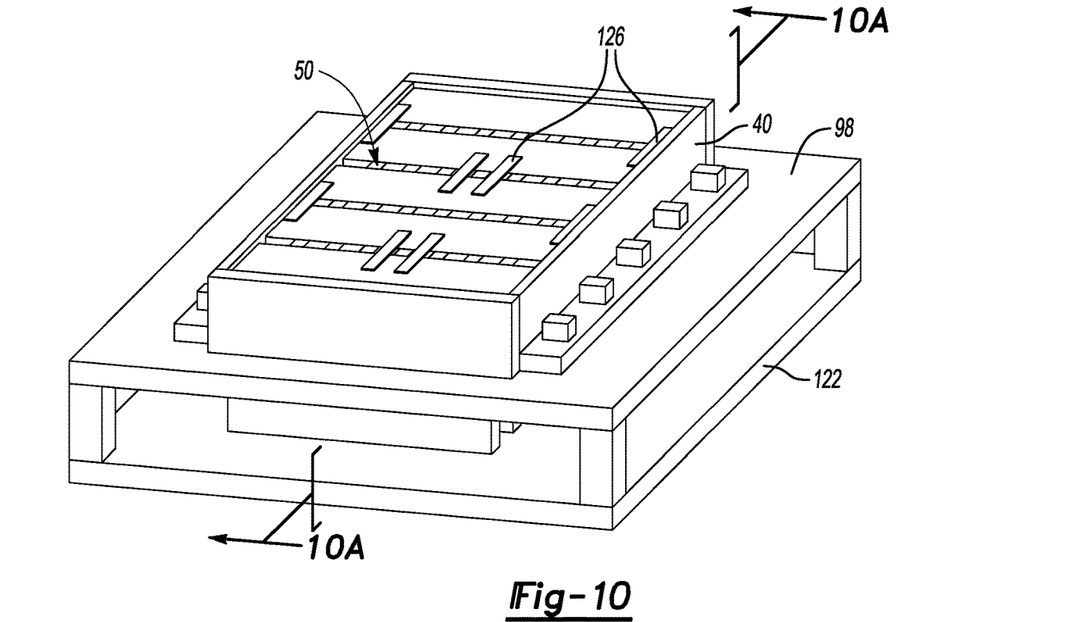
FIG. 10 illustrates the cell matrix of FIG. 6 after insertion into the enclosure halo.

With reference to FIG. 10, after the cell matrix 50 is positioned within the halo pallet 98, the halo pallet 98 can be positioned on a weld pallet 122. Busbar modules 126 can then be installed and secured to the terminals of the battery cells 30. In an example, a busbar is connected to each cell stack 46 via laser welds. The welds are then inspected. If the inspection is passed, additional busbars can be installed that electrically connect the cell stacks 46 to each other. At this stage, adhesives could also be injected between the cell stacks 46 to help bind together the cell matrix 50.

Figure 10A:
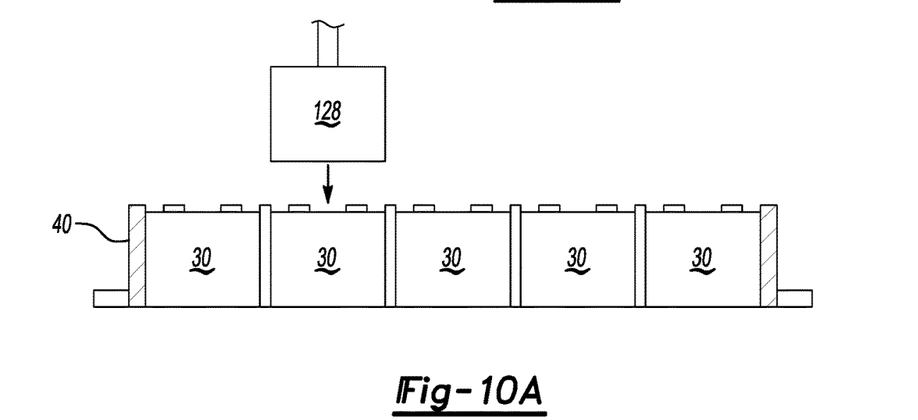
FIG. 10A illustrates a section view at line 10-10 in FIG. 10 when a pusher is used to extract a cell from the cell matrix.
Figure 10B:
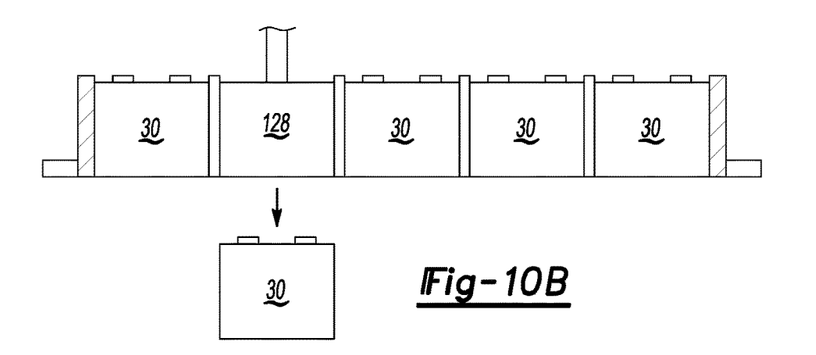
FIG. 10B illustrates the section view at line 10-10 in FIG. 10 after the pusher has extracted the cell from the cell matrix.

If an inspection, such as an inspection of the busbar welds, is not passed, removing one or more of the battery cells 30 from the cell matrix 50 may be required. Referring to FIGS. 10A and 10B, one or more of the busbar modules 126 can be removed, and a pusher 128 or "dummy block" can be used to extract one or more of the battery cells 30 out of the cell matrix 50 when the cell matrix 50 is held by the enclosure halo 40. The pusher 128 can be moved vertically until the pusher 128 presses against one or more of the battery cells 30 out of the cell matrix 50. After sufficient movement, the pusher 128 eventually occupies the place of the removed one or more battery cells 30. The pusher 128 can stay in this position until one or more replacement battery cells are ready for insertion into the cell matrix 50. At which time, the pusher 128 is gradually withdrawn as the one or more replacement battery cells are inserted. In some examples, the pusher 128 is used to extract an entire cell stack 46 from the cell matrix 50. The pusher 128 can be actuated by a servo or spindle-driven ball screw press, for example. The pusher may alternatively be withdrawn after removal of one or more battery cells 30.

In some examples, after the cell stacks 46 are assembled into the cell matrix 50 and compressed by the enclosure halo 40, electrical connections between the battery cells 30 of each of the cell stacks 46 are established. These connections can be tested prior to securing any busbar modules 126 that electrically connect the cell stacks 46 of the cell matrix 50. If issues arise with one or more battery cells 30, those battery cells 30 can be extracted from the cell matrix using the pusher 128. If there are no issues and the testing indicates that the cell stacks 46 are suitable for use, the busbar modules 126 can be installed.

In some examples, the pusher 128 can be used to extract one or more battery cells 30 from the cell matrix 50 after the traction battery pack assembly 14 is assembled. In such an example, the enclosure assembly 34 would need to be opened to provide the pusher 128 with access to the cell matrix 50.

Figure 11:
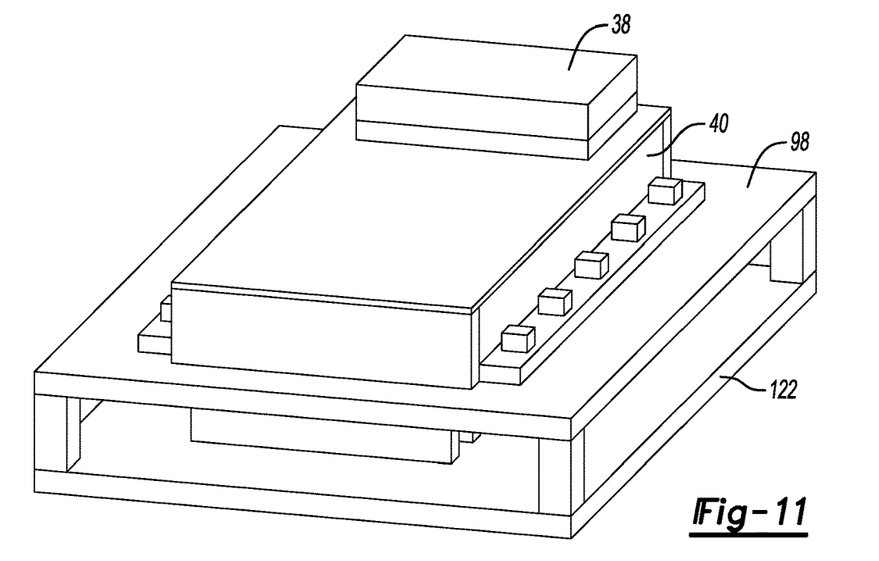
FIG. 11 illustrates the cell matrix and enclosure halo of FIG. 6 after securing an enclosure cover.

Referring now to FIG. 11, after the busbar modules 126, busbars, and other electronics modules are installed and electrical connections are made, the enclosure cover 38 is secured to the enclosure halo 40.

Figure 12:
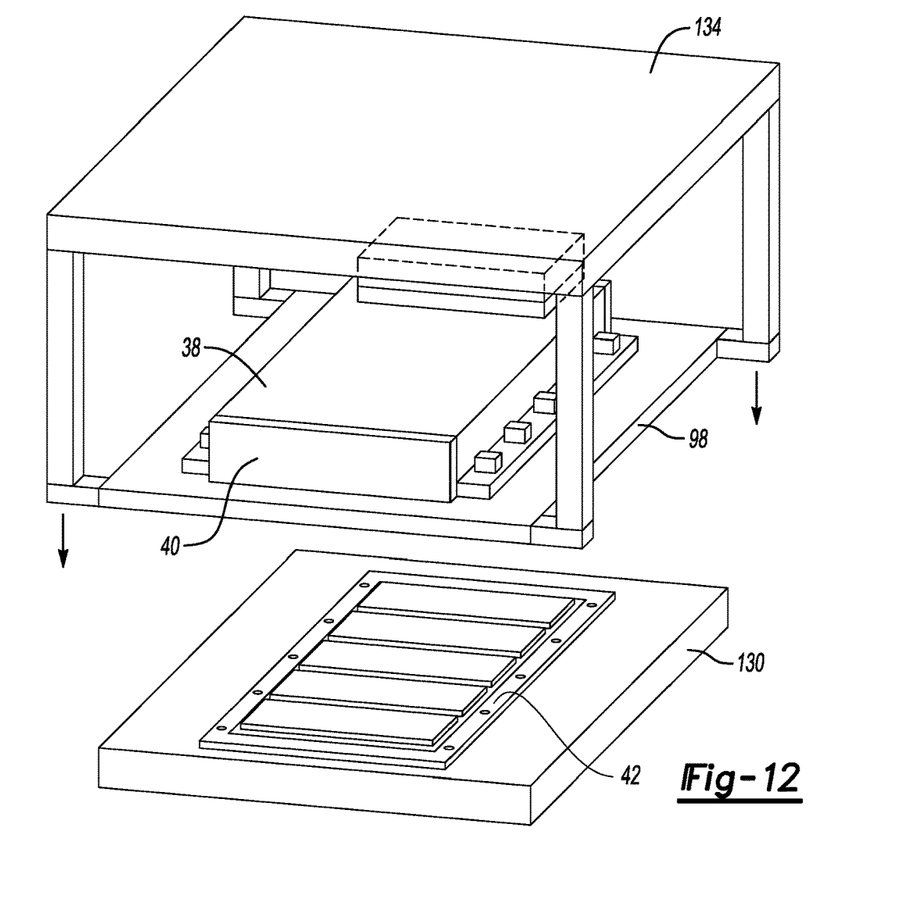
FIG. 12 illustrates the cell matrix and enclosure halo of FIG. 11 just before the securing of an enclosure floor.

With reference to FIG. 12, the halo pallet 98 with the enclosure halo 40 and the cell matrix 50 is next positioned adjacent the enclosure floor 42, which is held by a tray pallet 130. A robotic lifter 134 can be used to position the halo pallet 98.

The tray pallet 130 and enclosure floor 42 are then moved vertically relative to the halo pallet 98, enclosure halo 40, and the cell matrix 50 until the enclosure floor 42 is in a position appropriate for securement to the enclosure halo 40. The enclosure floor 42 is then secured to the enclosure halo 40 via welds or mechanical fasteners, for example. Thermal exchange plates, thermal interface material, etc. can be mounted on the enclosure floor 42 prior to the securing of the enclosure floor 42 to the enclosure halo 40. The traction battery pack assembly 14 can then be installed into the electrified vehicle 10 of FIG. 1.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A battery pack assembly method, comprising:
compressing at least one cell stack within a compression fixture;
displacing the at least one cell stack from within the compression fixture while inserting the at least one cell stack into a cell-receiving opening of an enclosure structure; and
when the at least one cell stack is within the enclosure structure and outside the compression fixture, pushing at least one cell of the at least one cell stack out of the enclosure structure using a pusher.

2. The method of claim 1, wherein the compressing includes compressing a first cell stack and a second cell stack, wherein the inserting comprises simultaneously inserting both the first cell stack and the second cell stack into the enclosure structure.

3. The method of claim 2, further comprising simultaneously inserting the first cell stack together with the second cell stack using a plunger that contacts both the first cell stack and the second cell stack during the inserting.

4. The method of claim 2, wherein the first cell stack and the second cell stack are spaced from each other during the inserting.

5. The method of claim 2, further comprising compressing the first cell stack using a first compression fixture, and compressing the second cell stack using second compression fixture that is different than the first compression fixture.

6. The method of claim 1, wherein the enclosure structure is an enclosure halo.

7. The method of claim 1, wherein the compressing of the at least one cell stack is along an axis, wherein the inserting moves the at least one cell stack relative to the enclosure structure in a direction that is perpendicular to the axis.

8. The method of claim 1, further comprising after the inserting, applying a compressive force to the at least one cell stack with the enclosure structure.

9. The method of claim 1, wherein the enclosure structure circumferentially surrounds the at least one cell stack after the inserting.

10. The method of claim 1, wherein the pushing is in response to an inspection of the at least one cell stack after the inserting.

11. The method of claim 10, wherein the inspection includes an inspection of a weld.

12. The method of claim 11, wherein the weld is a busbar weld.

13. The method of claim 1, wherein the at least one cell stack includes a first number of individual cells, wherein the at least one cell that is pushed by the pusher comprises a second number of individual cells that is fewer than the first number of individual cells.

14. A battery pack assembly method, comprising:
compressing at least one cell stack;
inserting the at least one cell stack into a cell-receiving opening of an enclosure structure; and
pushing at least one cell of the at least one cell stack out of the enclosure structure using a pusher,
wherein the compressing includes compressing a first cell stack and a second cell stack, wherein the inserting comprised inserting both the first cell stack and the second cell stack into the enclosure structure
compressing the first cell stack using a first compression fixture, and compressing the second cell stack using second compression fixture that is different than the first compression fixture, wherein the first cell stack and the second cell stack are each disposed along a respective cell stack axis, and further comprising, prior to the inserting, pressing the first cell stack relatively toward the second cell stack.

15. The method of claim 14, further comprising pressing until the first compression fixture contacts the second compression fixture.

16. The method of claim 14 wherein the pusher occupies the place of the at least one cell that is pushed out of the enclosure structure until at least one replacement cell is inserted into the cell-receiving opening of the enclosure structure.

17. The method of claim 14, wherein the enclosure structure is an enclosure halo.

\* \* \* \* \*

UNITED STATES PATENT AND TRADEMARK OFFICE
CERTIFICATE OF CORRECTION

PATENT NO. : 12,374,750 B2
APPLICATION NO. : 17/844311
DATED : July 29, 2025
INVENTOR(S) : Chang et al.

Page 1 of 1

It is certified that error appears in the above-identified patent and that said Letters Patent is hereby corrected as shown below:

In the Claims

Claim 14, Column 8, Line 62, after "structure" insert --,--.

Claim 14, Column 8, Line 63, before "compressing" insert --wherein the compressing further includes--.

Signed and Sealed this
Second Day of September, 2025

Coke Morgan Stewart
*Acting Director of the United States Patent and Trademark Office*